(12) United States Patent
Stuhec

(10) Patent No.: US 10,505,873 B2
(45) Date of Patent: Dec. 10, 2019

(54) STREAMLINING END-TO-END FLOW OF BUSINESS-TO-BUSINESS INTEGRATION PROCESSES

(71) Applicant: Gunther Stuhec, Heidelberg (DE)

(72) Inventor: Gunther Stuhec, Heidelberg (DE)

(73) Assignee: SAP SE, Walldorf (DE)

( * ) Notice: Subject to any disclaimer, the term of this patent is extended or adjusted under 35 U.S.C. 154(b) by 530 days.

(21) Appl. No.: 14/585,556

(22) Filed: Dec. 30, 2014

(65) Prior Publication Data

US 2016/0191431 A1 Jun. 30, 2016

(51) Int. Cl.
*H04L 12/58* (2006.01)
*H04L 12/24* (2006.01)

(52) U.S. Cl.
CPC ............ *H04L 51/066* (2013.01); *H04L 41/02* (2013.01); *H04L 51/18* (2013.01)

(58) Field of Classification Search
CPC ..................................................... H04L 51/066
USPC ......................................................... 709/218
See application file for complete search history.

(56) References Cited

U.S. PATENT DOCUMENTS

| | | | |
|---|---|---|---|
| 7,624,113 B2 | 11/2009 | Stuhec | |
| 7,698,174 B2 | 4/2010 | Brunswig et al. | |
| 7,711,676 B2 | 5/2010 | Stuhec | |
| 7,716,164 B2 | 5/2010 | Stuhec | |
| 7,716,255 B2 | 5/2010 | Stuhec | |
| 7,818,342 B2 | 10/2010 | Stuhec | |
| 7,836,392 B2 | 11/2010 | Stuhec et al. | |
| 7,856,597 B2 | 12/2010 | Stuhec | |
| 7,865,519 B2 | 1/2011 | Stuhec | |
| 7,937,408 B2 | 5/2011 | Stuhec | |
| 8,041,746 B2 | 10/2011 | Stuhec | |
| 8,078,568 B2 | 12/2011 | Stuhec et al. | |
| 8,086,646 B2 | 12/2011 | Stuhec et al. | |
| 8,087,030 B2 | 12/2011 | Stuhec et al. | |
| 8,150,833 B1 | 4/2012 | Scotton et al. | |
| 8,271,503 B2 | 9/2012 | Glaenzer et al. | |
| 8,280,755 B2 | 10/2012 | Stuhec et al. | |
| 8,290,989 B2 | 10/2012 | Stuhec et al. | |
| 8,307,027 B2 | 11/2012 | Stuhec et al. | |
| 8,381,229 B2 | 2/2013 | Stuhec et al. | |
| 8,402,053 B2 | 3/2013 | Roediger et al. | |
| 8,554,538 B2 | 10/2013 | Stuhec | |

(Continued)

OTHER PUBLICATIONS

Gunther Stuhec, Streamlining and Simplifying B2B Integration for Enhanced Interoperability: SCN, Sep. 1, 2014; 18 pages.

*Primary Examiner* — Sm A Rahman
*Assistant Examiner* — Emad Siddiqi
(74) *Attorney, Agent, or Firm* — Fish & Richardson P.C.

(57) ABSTRACT

Techniques for managing communication between businesses include defining a plurality of business context parameters associated with a first entity and a second entity; retrieving a first set of business requirements from a first entity and a second set of business requirements from a second entity based on the business context parameters; generating a message implementation guideline including one or more source elements associated with the first set of business requirements; receiving a second message implementation guideline including one or more target elements from the second entity; and generating a mapping guideline including mapping entities between the one or more source elements and the one or more target elements.

20 Claims, 12 Drawing Sheets

(56) References Cited

U.S. PATENT DOCUMENTS

| | | |
|---|---|---|
| 8,606,723 B2 | 12/2013 | Seubert et al. |
| 8,655,756 B2 | 2/2014 | Seubert et al. |
| 8,676,866 B2 | 3/2014 | Lemcke et al. |
| 8,694,397 B2 | 4/2014 | Seubert et al. |
| 8,892,575 B2 | 11/2014 | Stuhec et al. |
| 2004/0268247 A1* | 12/2004 | Rosenpflanzer .... G06F 17/3056 715/249 |
| 2005/0125781 A1* | 6/2005 | Swamy ............... G06F 17/2247 717/144 |
| 2007/0276948 A1 | 11/2007 | Burdett et al. |
| 2009/0132461 A1* | 5/2009 | Garg .................... H04L 9/3247 706/54 |
| 2011/0131545 A1* | 6/2011 | Patrascu .................. G06F 8/20 717/100 |
| 2012/0324588 A1 | 12/2012 | Stuhec et al. |
| 2013/0204909 A1 | 8/2013 | Lemcke et al. |
| 2016/0132838 A1* | 5/2016 | Grossman ............. G06Q 10/00 705/305 |

* cited by examiner

FROM FIG. 4C

| Properties | Mapping Entities | Test Results | 420 |

```
1   <?xml version="1.0" encoding=UTF-8"?>
2   <Document xml:schemaLocation="urn:iso:std=iso:20022:tech:xsd:pain.001.001.03
    pain.001.001.03.xsd" xmlns="urn:iso:std=iso20022:tech:xsd:pain001.001.03=
    xmlns:xs1="http://www.w3.org/2001/XMLSchema=instance">
3       <CstmrCdtTerlmitn>
4           <GrpMdr>
5               <MsgId>243334</MsgId>
6               <CreDtTm>2014=DB=12T09:30:47Z</CrnDtTm>
7               <NbOfTxs>15</NbOfTxs>
8               <CtrlSum>243284.52</CtrlSum>
9               <InitgPty>
10                  <Nm>Entite Societe</NM>
11                  <Pat1Adr>
12                      <StrtNm>Rue du Parc<StrtNm>
13                      <BldgNb>100</BldgNb>
14                      <FstCd>75008</FstCd>
15                      <TwnNm>Paris<TwnNm>
16                      <Ctry>FR</Ctry>
17                  <Fst1Adr>
18              </InitgPty>
19          </GrpHdr>
20      <PmtInf>
21          <PmtInfId>FR13500154</PmtInfId>
22          <PmtMtd>CHK<</PmtMtd>
23          <BtchBookg>true</BtchBookg>
24          <NbOfTxs>5</NbOfTxs>
25          <CtrlSum>1002.43</CtrlSum>
26      <PmtTpInf>
27          <ReqdExctnDt>2014-06-13</ReqdExctnDt>
28          <Dbtr>
29              <NmCity Company</Nm>
30              <Pst1Adr>
31                  <StrtNm> Name Strasse</StrtNm>
32                  <BldgNb>10</BldgNb>
33                  <FstCd>10115</FstCd>
34                  <TwnNm>Berlin<TwnNm>
35                  <Ctry>DE</Ctry>
```

TO FIG. 4E

⇧ Upload    ⇩ Download    Simulate

FIG. 4D

FROM FIG. 4C

420

| # | | |
|---|---|---|
| 1 | EDI_DC40 | 1210000000000201423492C  3014  FEXR2001 |
| | | PAYMENT |
| 2 | | SAFE:12   LS   I:4CLNT132 |
| 3 | E2DIRDRU1 | 12100000000002014120001000000001FEXEXTENDED |
| 4 | PAYMENT ORDER | 2000000001                                      DEF001 |
| 5 | E2EDR03 | 121000000000020140812000200000000201120010322171105 |
| 6 | E2EDR03 | 12100000000002014081200030000000202620140814 |
| 7 | E2EDR02 | 1210000000000201408120005000000010578000000002 |
| | E2EDR02 | 1210000000000201408120005000000010578000000002 |
| 8 | E2IDRU3002 | 121000000000020140812000700000001              E |
| | IECDEB1   20140814 | |
| | E2IDB02003 | 121000000000020140812001000000002BA FRENCHBANK |
| | 002100000         999DFE | |
| 9 | | DUBLIN |
| | | IE |
| | E2IDB02003 | 121000000000020140812001100000002BB FREBAXXF |
| | 002450032         013FRENCHBANK | |
| | | LONDON |
| 10 | | FR 435454333 |
| | 000000000E08 | |
| | E2EDKA1003 | 121000000000020140812001300000002RG 0000200000 |
| 11 | | ENTITE SOCIETE RUE DUE PARC 100A 75008 PARIS |
| | FRA SOC | |
| | E2EDKA1003 | 121000000000020140812001300000002AA 0000200000 |
| 12 | CITY COMPANY | NEUE STRASSE 10      12012 BERLIN |
| | DEU SOC | |
| 13 | E2IDPU1 | 121000000000020140812001400000002INVSIMULATION |
| 14 | TEST10     20140814 | |
| 15 | E2EDPU5 | 12100000000002014081200030000000020032434332432 |
| 16 | ⊟E2EDP03 | 12100000000002014081200030000000020694543566345665 |
| 17 | E2EDP03 | 121000000000020140812000300000002072ABCVDEEW24434 |
| | E2EDP02 | 12100000000002014081200030000000201320140814 |
| 18 | E2EDPU3 | 121000000000020140812000700000001              E |
| | EBFEED2   234325423 | |
| | E2IDLU5001 | 12100000000002014081200320000002004354443.00 |
| | EUR | |

FROM FIG. 4D 422   424   426

⬇ Download   ▦ Comment   ✎ Edit

FIG. 4E

STREAMLINING END-TO-END FLOW OF BUSINESS-TO-BUSINESS INTEGRATION PROCESSES

BACKGROUND

Enterprises can use business-to-business (B2B) integration by connecting to the computer systems of multiple trading partners, for efficiently performing and tracking a variety of business processes. The process of B2B integration is a resource intensive environment, in which data transfers usually occur between the trading partners through a defined channel and in a defined format as agreed upon by the participating trading partners. The process of B2B integration is currently driven by heterogeneous landscapes with a plethora of overly complex and cryptic interfaces. Many of the B2B interfaces address the same use case, making the process of B2B integration a time consuming and error-prone activity.

SUMMARY

Implementations of the present disclosure include computer-implemented methods for managing communication between businesses. An example implementation includes a computer-implemented method for managing communication between businesses that includes defining a plurality of business context parameters associated with a first entity and a second entity; retrieving a first set of business requirements from a first entity and a second set of business requirements from a second entity based on the business context parameters; generating a message implementation guideline including one or more source elements associated with the first set of business requirements; receiving a second message implementation guideline including one or more target elements from the second entity; and generating a mapping guideline including mapping entities between the one or more source elements and the one or more target elements.

In a first aspect combinable with the example implementation, generating a message implementation guideline includes a comparison of the business requirements to standard requirements.

In a second aspect combinable with any of the previous aspects, the mapping entities are dependent on semantics and a structure of one of the one or more source elements and one of the one or more target elements.

In a third aspect combinable with any of the previous aspects, the message implementation guideline is a table including a plurality of columns, each of the columns including a plurality of notes and implementation instructions.

In a fourth aspect combinable with any of the previous aspects, the message implementation guideline includes unstructured text blocks.

In a fifth aspect combinable with any of the previous aspects, the message implementation guideline includes tag names, cardinality and base types.

A sixth aspect combinable with any of the previous aspects further includes displaying a result list including a plurality of message implementation guideline templates.

In a seventh aspect combinable with any of the previous aspects, each of the plurality of message implementation guideline templates includes a system type, an identification, a version and a frequency of usage.

In an eighth aspect combinable with any of the previous aspects, generating the message implementation guideline further includes modifying one of the plurality of message implementation guideline templates based on matching elements.

A ninth aspect combinable with any of the previous aspects further includes testing of the mapping interface based on business expertise and integration expertise.

In a tenth aspect combinable with any of the previous aspects, the message implementation guideline includes a plurality of filter criteria.

An eleventh aspect combinable with any of the previous aspects further includes transmitting the message implementation guideline to the second entity.

A twelfth aspect combinable with any of the previous aspects further includes performing a syntax conversion for the one or more source elements and the one or more target elements.

In a thirteenth aspect combinable with any of the previous aspects, generating a mapping guideline further includes validation of mapping based by using a rules validation component.

In a fourteenth aspect combinable with any of the previous aspects further includes generating a mapping message based on the mapping guideline.

In a fifteenth aspect combinable with any of the previous aspects further includes transmitting the mapping message to the second entity for testing.

In a sixteenth aspect combinable with any of the previous aspects further includes updating the mapping guideline based on testing.

Various embodiments of streamlining end-to-end flow of B2B integration according to the present disclosure may have one or more of the following features. For example, the present disclosure provides for automating, streamlining and simplifying the entire end-2-end B2B integration process from requirement phase to productive runtime phase. The simplification of the B2B integration processes is due to, for instance, the use of a cloud based service that uses an intelligent and crowd sourcing based approach coupled with the power of the cloud to provide best fit proposals for message implementation guidelines and mapping guidelines (e.g., "interface specification," "interface documentation," "mapping specification" and "mapping documentation"). Additionally, the simplification of the B2B integration processes can also be due to the cloud based collaborative working environment for the collaborative working, negotiation and agreement of these guidelines, and the cloud based networking approach for sharing the guidelines between the business partners. The present disclosure includes the combination of multiple phases of streamlining end-to-end flow of B2B integration processes into a unified tool, thus eliminating the current need for using different tools from different sources, each with their own mode of expression of the output at the various stages of the process. The present disclosure enables a collaborative guideline building of message, structure, interfaces, meta-models and mappings. The guidelines can provide the common understanding and transparency for every user at every stage of the end-to-end flow of an integration project. As another example, the B2B integration may provide for quick and easy connection between business applications due to, for instance, open communication, real-time collaboration, information sharing, updates and complete visibility between the business partners during each phase of the B2B integration process. The present disclosure can further enable a common understanding and transparency of the used B2B interfaces between the involved business partners or business domain experts.

These general and specific aspects may be implemented using a device, system or method, or any combinations of devices, systems, or methods. For example, a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 4C-4E depict sections of an example mapping process in accordance with implementations of the present disclosure.

DETAILED DESCRIPTION

Implementations of the present disclosure are generally directed to software, computer-implemented methods, and systems for providing streamlining end-to-end flow of B2B integration processes. This streamlining end-to-end flow can be realized by an integrated tool based on a cloud based service, available to multiple business partners interested in B2B integration processes. In other words, the present disclosure provides systems and methods for automating, streamlining and simplifying the entire end-2-end B2B integration from requirement phase to productive runtime phase.

Figure 1:
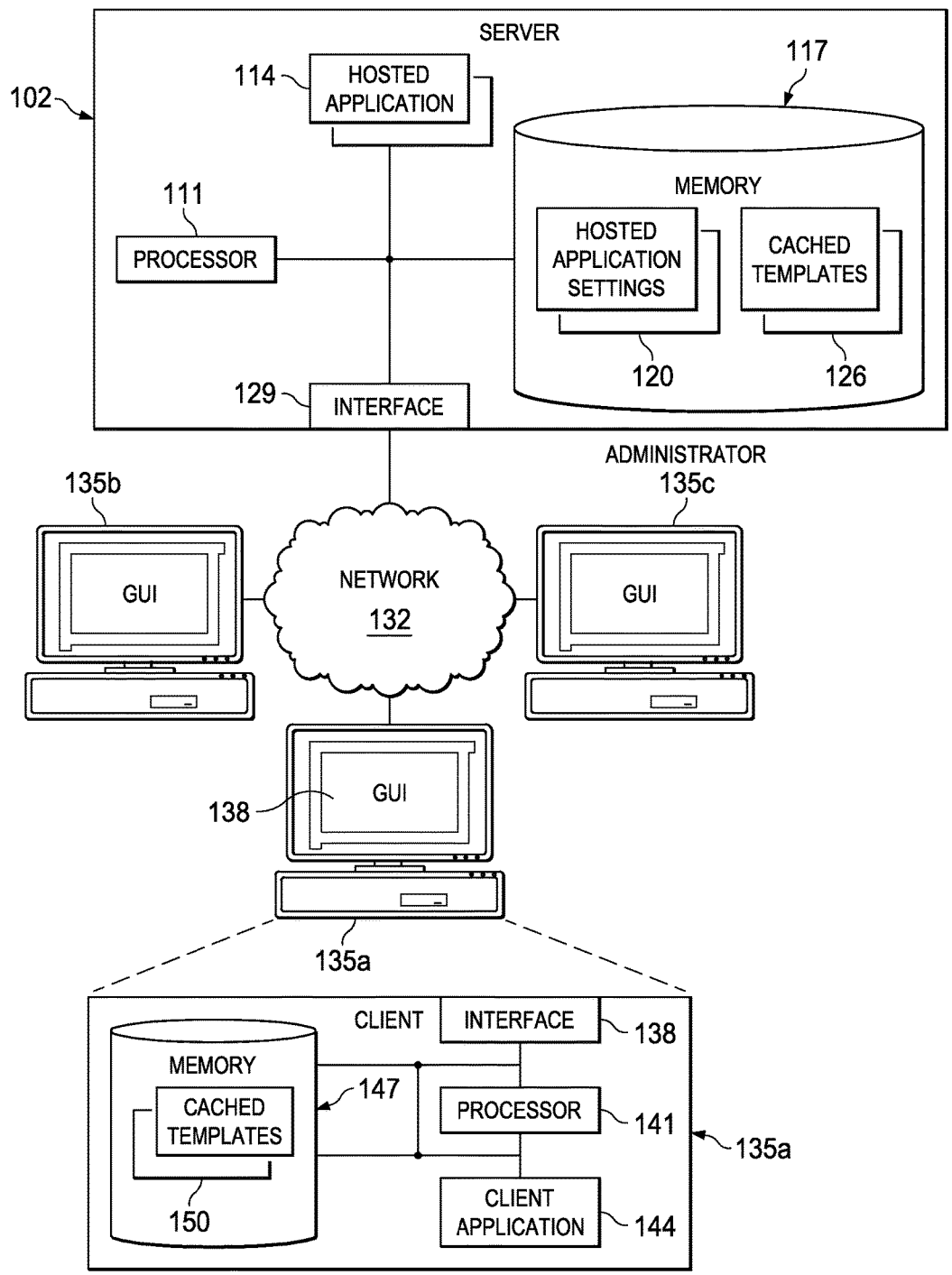
FIG. 1 depicts an example high-level architecture in accordance with implementations of the present disclosure.

FIG. 1 depicts an example architecture 100 in accordance with implementations of the present disclosure. The example architecture 100 includes or is communicably coupled with server 102 and one or more clients 135, at least some of which communicate across network 132. In general, architecture 100 depicts an example configuration of a system capable of providing streamlining end-to-end flow of B2B integration processes in response to requests from its clients 135.

In general, the server 102 is any server that stores one or more hosted B2B integration applications 114, where at least a portion of the hosted B2B integration applications 114 are executed via requests and responses sent to users or clients within and communicably coupled to the illustrated architecture 100 of FIG. 1. In some instances, the server 102 may store a plurality of various hosted B2B integration applications 114, while in other instances, the server 102 may be a dedicated server meant to store and execute only a single hosted B2B integration process application 114. In some instances, the server 102 may comprise a web server, where the hosted B2B integration applications 114 represent one or more web-based or cloud-based applications accessed and executed via network 132 by the clients 135 of the system to perform the programmed tasks or operations of the hosted B2B integration process application 114.

At a high level, the server 102 includes an electronic computing device operable to receive, transmit, process, store, or manage data and information associated with the architecture 100. Specifically, the server 102 illustrated in FIG. 1 is responsible for receiving application requests from one or more client B2B integration applications 144 associated with the clients 135 of architecture 100 and responding to the received requests by processing said requests in the associated hosted B2B integration application 114, and sending the appropriate response from the hosted B2B integration application 114 back to the requesting client B2B integration application 144. In addition to requests from the external clients 135 illustrated in FIG. 1, requests associated with the hosted B2B integration applications 114 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 102, architecture 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the example implementation, and as shown in FIG. 1, the server 102 includes a processor 111, an interface 129, a memory 117, and one or more hosted B2B integration applications 114. The interface 129 is used by the server 102 for communicating with other systems in a client-server or other distributed environment (including within architecture 100) connected to the network 132 (e.g., client 135, as well as other systems communicably coupled to the network 132). Generally, the interface 129 comprises logic encoded in software and/or hardware in a suitable combination and operable to communicate with the network 132. More specifically, the interface 129 may comprise software supporting one or more communication protocols associated with communications such that the network 132 or interface's hardware is operable to communicate physical signals within and outside of the illustrated architecture 100.

Generally, the network 132 facilitates wireless or wireline communications between the components of the architecture 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102. Further, all or a portion of the network 132 can comprise either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated architecture 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular needs, desires, or particular embodiments of architecture 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted B2B integration applications 114. Specifically, the server's processor 111 executes the functionality required to receive and respond to requests from the clients 135 and their respective client B2B integration applications 144, as well as the functionality required to perform the other operations of the hosted B2B integration application 114. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated architecture 100, processor 111 executes one or more hosted B2B integration applications 114 on the server 102.

In some implementations, two different types of B2B integration applications 144 are required for executing the whole B2B integration process. The first type of application can be focused on the specification- and design-time of the B2B integration process. The second type of application can be focused on the runtime of the B2B integration process. For the first type of application, the business partners are collaboratively working on the message implementation and mapping guidelines. The whole content of the first type of application can be runtime agnostic. The generators generating the runtime specific artefacts can be based on rules and conventions of the runtime application. The runtime specific artefacts can be stored in the repository of the second type of application and can be deployed so that they can be used at the runtime application.

At a high level, each of the one or more hosted B2B integration applications 114 is any application, program, module, process, or other software that may execute, change, delete, generate, or otherwise manage information according to the present disclosure, particularly in response to and in connection with one or more requests received from the illustrated clients 135 and their associated client B2B integration applications 144. In certain cases, only one hosted B2B integration application 114 may be located at a particular server 102. In others, a plurality of related and/or unrelated hosted B2B integration applications 114 may be stored at a single server 102, or located across a plurality of other servers 102, as well. In certain cases, architecture 100 may implement a composite hosted B2B integration application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted B2B integration applications 114 may represent web-based applications accessed and executed by remote clients 135 or client B2B integration applications 144 via the network 132 (e.g., through the Internet). Further, while illustrated as internal to server 102, one or more processes associated with a particular hosted B2B integration application 114 may be stored, referenced, or executed remotely. For example, a portion of a particular hosted B2B integration application 114 may be a web service associated with the application that is remotely called, while another portion of the hosted B2B integration application 114 may be an interface object or agent bundled for processing at a remote client 135. Moreover, any or all of the hosted B2B integration applications 114 may be a child or sub-module of another software module or enterprise application (not illustrated) without departing from the scope of this disclosure. Still further, portions of the hosted B2B integration application 114 may be executed by a user working directly at server 102, as well as remotely at client 135.

The server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted B2B integration applications 114. Additionally, memory 117 may include any other appropriate data, such as VPN applications, firmware logs and policies, firewall policies, a security or access log, print or other reporting files, as well as others.

Specifically, illustrated memory 117 includes a set of hosted B2B integration application settings 120 and a set of cached templates of B2B standard message 126. Although illustrated within memory 117, some or all of the illustrated elements may be located or stored outside of memory 117 and/or server 102 (e.g., in different memories and/or on multiple different servers, as well as in other locations external to, but communicably coupled with, architecture 100). For example, the set of hosted B2B integration application settings 120 may be included within the programming of each associated hosted B2B integration application 114 such that the settings are inherent to the hosted B2B integration application 114 itself. Additionally, some or all of the set of hosted B2B integration application settings 120 may be stored at and specific to a particular client 135, and stored in the client's respective memory. In those instances, particular settings stored at the client 135 can be sent along with the requests to the hosted B2B integration application 114 in order to allow the hosted B2B integration application 114 to be initialized and executed in accordance with the proper settings. In general, the set of hosted B2B integration application settings 120 may include information such as a particular hosted B2B integration application's 114 preferred modes of operation for various requests and operations. Additionally, any other information relevant to the particular hosted B2B integration applications 114 can be stored in and included with the set of hosted B2B integration application settings 120 in particular embodiments.

Illustrated memory 117 also includes a set of cached templates of B2B standard message 126 representing the templates of B2B standard message used by the hosted B2B integration applications. Specifically, memory 117 is accessed by the hosted B2B integration application 114 as requests and context data are received, and updated as those templates of B2B standard message are processed and new message guidelines are generated. In order to preserve memory space, all or a portion of the set of cached templates of B2B standard message 126 may be associated with a particular timeout value, such that specific portions of the cached templates of B2B standard message 126 acts as temporary storage of the templates of B2B standard message of the hosted B2B integration applications 114.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135a, each client 135 includes a processor 141, an interface 138, a graphical user interface (GUI) 138, a client B2B integration application 144, and a memory 147. In general, each client 135 comprises an electronic computer device operable to receive, transmit, process, and store any appropriate data associated with the architecture 100 of FIG. 1. It will be understood that there may be any number of clients 135 associated with, or external to, architecture 100. For example, while illustrated architecture 100 includes three clients (135a, 135b, and 135c), alternative implementations of architecture 100 may include a single client 135 communicably coupled to the server 102, or any other number suitable to the purposes of the architecture 100. Additionally, there may also be one or more additional clients 135 external to the illustrated portion of architecture 100 that are capable of interacting with the architecture 100 via the network 132. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted B2B integration application 114) or the client 135 itself, including digital data, visual information, the client B2B integration application 144, or the GUI 138. Both the input and output device may include fixed or removable storage media such as a magnetic storage media, CD-ROM, or other suitable media to both receive input from and provide output to users of the clients 135 through the display, namely, the GUI 138.

As indicated in FIG. 1, client 135c is specifically associated with an administrator of the illustrated architecture 100. The administrator 135c can modify various settings associated with one or more of the other clients 135, the server 102, the hosted B2B integration application 114, and/or any relevant portion of architecture 100. For example, the administrator 135c may be able to modify the relevant timeout values associated with each hosted B2B integration application 114, as well as any of the set of hosted B2B integration application settings 120.

Importantly, each client 135 includes a client B2B integration application 144 associated with the hosted B2B integration application 114. In particular, the client B2B integration application 144 is any software, such as a web browser or remote portion of the hosted B2B integration application 114 that allows the client 135 to access and work with the hosted B2B integration application 114. Particularly, the client B2B integration application 144 is a software application that enables the client 135 (or a user thereof) to display and interact with one or more of the hosted B2B integration applications 114 executed at the server 102. Where the hosted B2B integration applications 114 are web-based applications, the client B2B integration application 144 may be specific applications dedicated to use with a particular hosted B2B integration application 114, a general web browser with adequate functionality to interact with the hosted B2B integration application 114, or any other appropriate software.

Further, the illustrated client 135 includes a GUI 138 comprising a graphical user interface operable to interface with at least a portion of architecture 100 for any suitable purpose, including generating a visual representation of the client B2B integration application 144 (in some instances, the client's web browser) and the interactions with the hosted B2B integration application 114, including the responses received from the hosted B2B integration application 114 received in response to the requests sent by the client B2B integration application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in architecture 100 and efficiently presents the information results to the user.

In general, the GUI 138 may include a plurality of user interface (UI) elements, some or all associated with the client B2B integration application 144, such as interactive fields, pull-down lists, and buttons operable by the user at client 135. These and other UI elements may be related to or represent the functions of the client B2B integration application 144, as well as other software applications executing at the client 135. In particular, the GUI 138 may be used to present the client-based perspective of the hosted B2B integration application 114, and may be used (as a web browser or using the client B2B integration application 144 as a web browser) to view and navigate the hosted B2B integration application 114, as well as various web pages located both internal and external to the server, some of which may be associated with the hosted B2B integration application 114. For purposes of the present location, the GUI 138 may be a part of or the entirety of the client B2B integration application 144, while also merely a tool for displaying the visual representation of the client and hosted B2B integration applications' 114 actions and interactions. In some instances, the GUI 138 and the client B2B integration application 144 may be used interchangeably, particularly when the client B2B integration application 144 represents a web browser associated with the hosted B2B integration application 114.

Similar to the server 102, the illustrated clients 135 include both an interface 138 and processor 141. The interface 138 of each client 135 may be similar to the interface 129 of the server 102, in that it may comprise logic encoded in software and/or hardware in a suitable combination and operable to communicate with the network 132. More specifically, interface 138 may comprise software supporting one or more communication protocols such that the network 132 or hardware is operable to communicate physical signals to and from the client 135. The client's processor 141 may also be similar in nature to that of the server's processor 111. Again, although only illustrated as a single processor 141, two or more processors may be used according to particular needs, desires, or embodiments of architecture 100.

Similar to the server's processor 111, each client processor 141 may be a central processing unit (CPU), a blade, an application specific integrated circuit (ASIC), a field-programmable gate array (FPGA), or another suitable component. Generally, the processor 141 executes instructions and manipulates data to perform the operations of the client 135 and, specifically, the associated client B2B integration application 144 described above. Specifically, the client's processor 141 executes the functionality required to send requests from the client 135 and its client B2B integration application 144, as well as receive and process the associated responses from the hosted B2B integration application 114.

Each client 135 also includes a memory 147. Memory 147 may be similar to the server's memory 117, and may include any memory or database module, taking the form of either volatile or non-volatile memory including, without limitation, magnetic media, optical media, random access memory (RAM), read-only memory (ROM), removable media, or any other suitable local or remote memory component. For example, memory 147 may store backup data, parameters, cookies, variables, algorithms, instructions, rules, or references thereto, as well as any other suitable data.

As specifically illustrated, memory 147 includes a set of cached templates of B2B standard message 150 associated with the client B2B integration application 144. The set of cached templates of B2B standard message 150 is used by the client B2B integration application 144 to cache, or store templates of B2B standard message associated with business contexts of the hosted B2B integration application 114. In some instances, the set of cached templates of B2B standard message 150 may store only the most recently used templates of B2B standard message associated with the hosted B2B integration application 114, while in other instances, the set of cached templates of B2B standard message 150 may store all templates of B2B standard message. When the client B2B integration application 144 generates a set of context data to be sent to the hosted B2B integration application 114, the client B2B integration application 144 can access the set of cached templates of B2B standard message 150 to retrieve and integrate matching templates of B2B standard message for being used in the hosted B2B integration application 114.

While FIG. 1 is described as containing or being associated with a plurality of elements, not all elements illustrated within architecture 100 of FIG. 1 may be utilized in each alternative implementation of the present disclosure. Additionally, one or more of the elements described herein may be located external to architecture 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
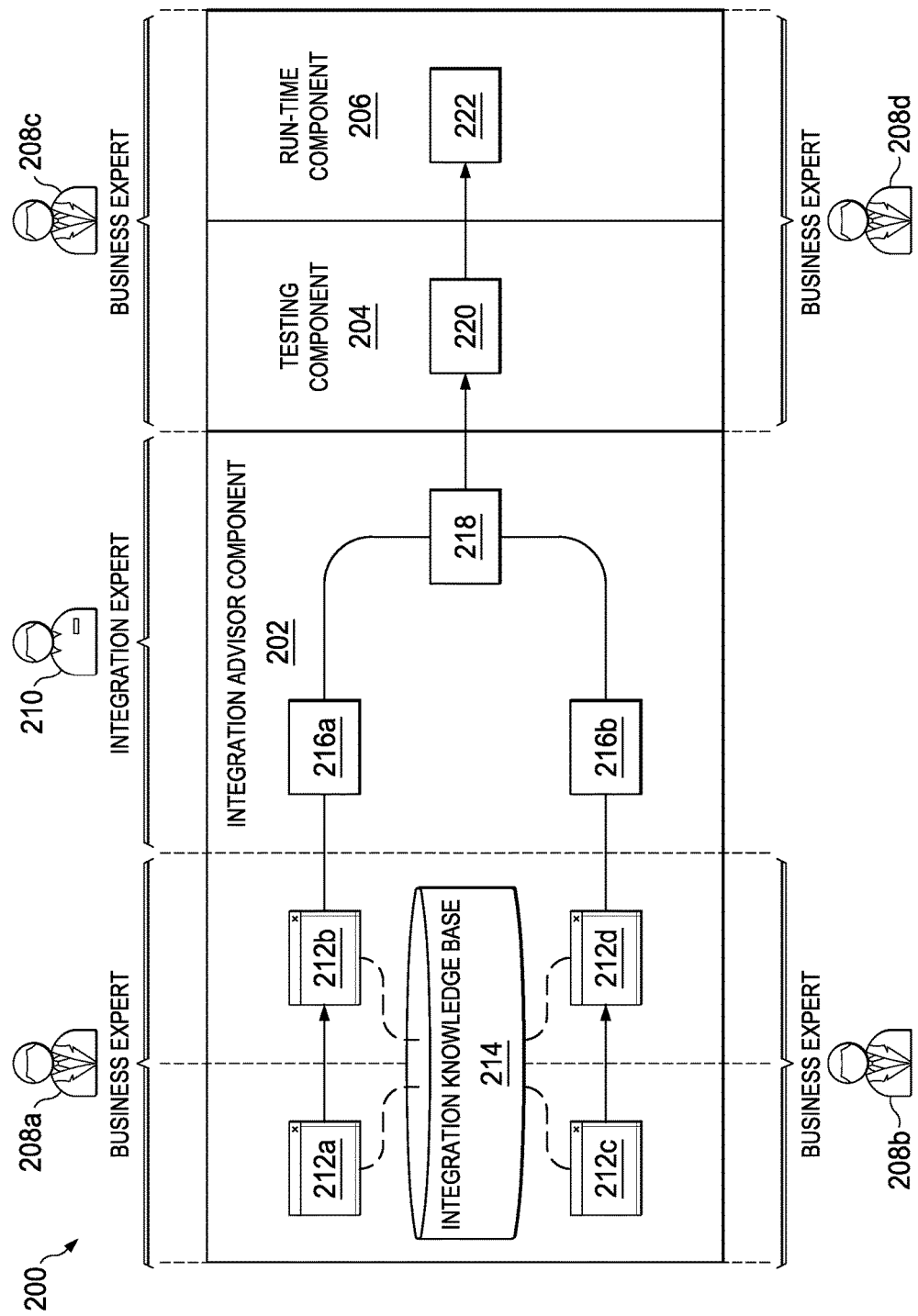
FIG. 2 depicts an example system that can be used to execute implementations of the present disclosure.

FIG. 2 is a diagram depicting an example B2B integration system 200. The example B2B integration system 200 can include an integration advisor component 202, a testing component 204 and a productivity runtime component 206. The integration advisor component 202, the testing component 204 and the productivity runtime component 206 can automatize the functions of the example B2B integration system 200. The example B2B integration system 200 can provide real time interaction between different business experts 208a, 208b, 208c and 208d and integration experts 210, supporting a plurality of business clients.

The integration advisor component 202 can generate the business oriented specification interfaces and mappings corresponding to technical representations. In some implementations, the integration advisor component 202 uses one or more templates of B2B standard messages 212a, 212b, 212c and 212d. The templates of B2B standard messages 212a, 212b, 212c and 212d can represent different views of message implementation guidelines or interface specifications at the different phases. The template of B2B standard message 212a or 212c can represent the requirement phase in which a proposal of message implementation guidelines, which might fit to the requirements in the specific business context. The template of B2B standard message 212b or 212*d* can represent the final message implementation guidelines, which exactly fit to the business needs in the given business context. The business expert can review the proposed message implementation guidelines and finalized the template of B2B standard message 212*b* or 212*d* according to the business needs.

The content of the templates of B2B standard messages 212*a*, 212*b*, 212*c* and 212*d* can be based on templates, which are provided by different standardization bodies such as X.12, UN/EDIFACT or SAP IDoc. The content of the templates of B2B standard messages 212*a*, 212*b*, 212*c* and 212*d* can be stored in an integration knowledge base 214. The integration knowledge base 214 can store every kind of B2B or interface library and associated documentation in any language. The content, which is stored in the integration knowledge base 214 is agnostic of any platform dependent syntax representation or runtime. The integration knowledge base 214 can be permanently updated, providing increasingly more accurate results for the example B2B integration system 200.

In some implementations, when the example B2B integration system 200 is to be adapted to a new business context, business requirements that were valid for a similar, previously occurring business context can be identified by the integration advisor component 202 in the integration knowledge base 208 and matching templates of B2B standard messages 212*a*, 212*b*, 212*c* and 212*d* can be retrieved.

The business context can serve as an initial starting point for the B2B integration system 200. The business context can include a plurality of context parameters that correspond to the first and second business entities. The context parameters can define a background, an environment, a framework, a setting, functions, and situations associated with the first and second business entities. In some implementations, the context parameters can include geo-political parameters (e.g., France), a business process role (e.g., creditor) and an industry classification (e.g., banking) In some implementations, the integration advisor component 202 can automatically generate a template for requesting a new message structure from the integration knowledge base 208. A template can be different from a message implementation guideline. A template can be a complete structure of a message type, which can be provided by the standardization body and a message implementation guideline can be a subset, which covers the aspects that are required by the business needs of a user. A template provides the structure and all descriptions, rules, code lists and constraints as defined by the standardization body, and the message implementation guideline covers the subset of the structure, the refined descriptions, handling treatments and very specific rules or constraints which are required so that the data can be unambiguously processed or consumed by applications.

The integration advisor component 202 can propose a message implementation guideline, which is based on a template and covers the aspects that are required in the given business context. The proposal could be based on a specific B2B standard. If the B2B standard is not given, it provides a list of message types from different B2B standards which can be used in the given context, because a number of message implementation guidelines are already defined in the given business context.

The integration advisor component 202 can display, for example on a GUI, the identified list of matching templates of B2B standard messages 212*a*, 212*b*, 212*c* and 212*d*. For example, the integration advisor component 202 can display a message implementation guideline proposal, which is based on a B2B standard template. The entered business context of the nodes of the message implementation guideline proposal matches to the nodes of the contributed and stored message implementation guidelines that are based on the same template and have the same business context. The display of the integration advisor component 202 can be used by the business expert 208*a* to review the message implementation guideline proposal and to generate a finalized message implementation guideline 216*a*. The display of the integration advisor component 202 can be used by the business expert 208*b* to generate a finalized message implementation guideline 216*b*. The finalized message implementation guidelines 216*a* and 216*b* can be stored in the integration knowledge base 214 and can be associated with a context. The business context classification can be used for the calculation of the proposals of further message implementation guidelines. For example, the stored message implementation guidelines can contribute to the calculation of further message implementation guidelines.

The integration advisor component 202 can automatically transmit the finalized message implementation guidelines from the business experts 208*a* and 208*b* of the business entities to the integration expert 210. In some implementations, the integration advisor component 202 automatically creates a draft integration flow compatible with a plurality of mapping platforms. The draft integration flow can cover the necessary components for validating, mapping and converting the instance data in accordance with the predefined definitions and rules of a mapping guideline 218. For example, the business expert 208*a* can share the finalized message implementation guideline with a business expert 208*b* of a trading partner by using the integration advisor component 202. The business expert 208*a* can give the business expert 208*b* permission to have access to the message implementation guideline via the integration advisor component 202. The business expert 208*b* of the trading partner can review this message implementation guideline and check, if all the business requirements are covered. If this shared message implementation guideline is based on a different B2B standard, the business expert 208*b* of the trading partner can request the integration advisor component 202 to retrieve a mapping guideline proposal between the trading partner's message implementation guideline and the shared message implementation guideline.

The rules of the proposal of a mapping message guideline 218 can include a plurality of functions that define the mapping between each pair of entities of the finalized message implementation guidelines 216*a* and 216*b* between the business expert 208*a* and the business expert 208*b* of the trading partner. In some implementations, the business expert 208*a* or 208*b* can create, add, modify or delete the mapping entities on semantic level. The mappings entities include the comparison of nodes of the source and target structures, descriptions and rules describing how the mapping entity has to be understood or treated.

Both business experts 208*a* and 208*b* are finalizing the mapping guideline, because they understand the corresponding message implementation guidelines (which are covered in the mapping guideline) much better. In other words, both business experts 208*a* and 208*b* collaboratively work on the mapping guideline. Both business experts 208*a* and 208*b* review the proposal, change the proposed mapping entities, and submit comments to the trading partner, if they need some clarifications or if they have doubts. Both business experts 208*a* and 208*b* can also do mediation and negotiation on mapping entities or even the rules. Finally, the business experts 208*a* and 208*b* commit the final mapping guideline, which then can be stored into the integration knowledge base 214. The mapping entities of the stored mapping guideline can be covered if a new mapping guideline proposal between the same message types has to be calculated. After the finalization of the mapping guideline, the finalized mapping guideline can be transformed into the runtime specific representation based on the platform dependent language and syntax of the runtime implementation. The finalized mapping guideline includes the source schema, target schema, message mapping rules, validation rules for validating structure, types, constraints, business rules, and syntax conversion rules. The finalized mapping guideline can be called message mapping, if the message guideline is translated in to the platform depended representation.

Using the integration advisor, the integration expert 210 can automatically update the mapping message guideline 218 in the central integration knowledge base 214 enabling the business experts 208a and 208b to read the most current version of the mapping message guideline 218. The integration advisor component 202 can include a mapping message generator that can directly derive a mapping message 220 from the mapping message guideline 218. The mapping message 220 can include the technical functions such as code value mapping or format transformations of data values that are automatically generated by the integration advisor component 202.

The integration advisor component 202 can automatically transmit the mapping message 220 to the testing component 204. The testing component 204 can enable the deployment of mapping message 220 for simulations and tests that can be performed by both business experts 208c and 208d, simultaneously or separately. The testing component 204 can process the source and target test data to be displayed in a readable format. The testing component provides a complete overview of the mapping message 220, including the source data, the target test data and the syntax conversion, in a single and easily understandable view including the mapping guideline, which provides the whole semantics. The complete overview facilitates the interpretation of the test results by the business partners 208c and 208d. The source data and target test data can be displayed together with the corresponding elements in the mapping message 220.

Both the source data and the target data includes a plurality of elements. Each of the elements of the source data and the target data can be displayed as readable semantics to enable a direct comparison of the source and target elements. The display of the testing component can enable a user to understand the source to target data mapping without any technical understanding of the mapping message 220 or the technical representation of the origin source and target data and final instance source and target data. A user (e.g., business expert 208c or 208d) interacting with the display of the testing component 204 can access to read the test results. Both business experts 208c and 208d can collaboratively review and comment on the test results. The business experts 208c and 208d can also change the mapping guideline in the same view. The test results can include the native syntax expressions of the corresponding origin and final instance data.

The testing component 204 can transmit the tested mapping message 222 to the productive runtime component 206. In some implementations, the testing component 204 performs the transmission of the tested mapping message 222 to the productive runtime component upon receiving an agreement of both business experts 208c and 208d. The productive runtime component 206 can include runtime connectivity between the business entities. In some implementations the runtime connectivity can include one or more of a cloud and on premise solutions. The productive runtime component 206 can include real-time process integration capabilities that enable a bidirectional integration that connects data and business processes in cloud solutions with cloud and on premise enterprise software from a business host and other vendors.

FIGS. 3A-3D illustrate example screen-shots of a message implementation guideline 300. Generally, a message implementation guideline 300 can include on business semantic level, unambiguously: the used B2B standard, version and business message, definition, scope, business context and usage of the business message, substructure including cardinality, which is used and required for the specific business purpose, the definition, format, behavior in ingoing or outgoing direction, properties, usage, and constraints of each element that is considered in the substructure, business rules and/or constraints defining the requirements and behavior across elements, applied code lists, values and their business meaning, applied identifier schemes, entities and the business meaning, examples and remarks.

Figure 3A:
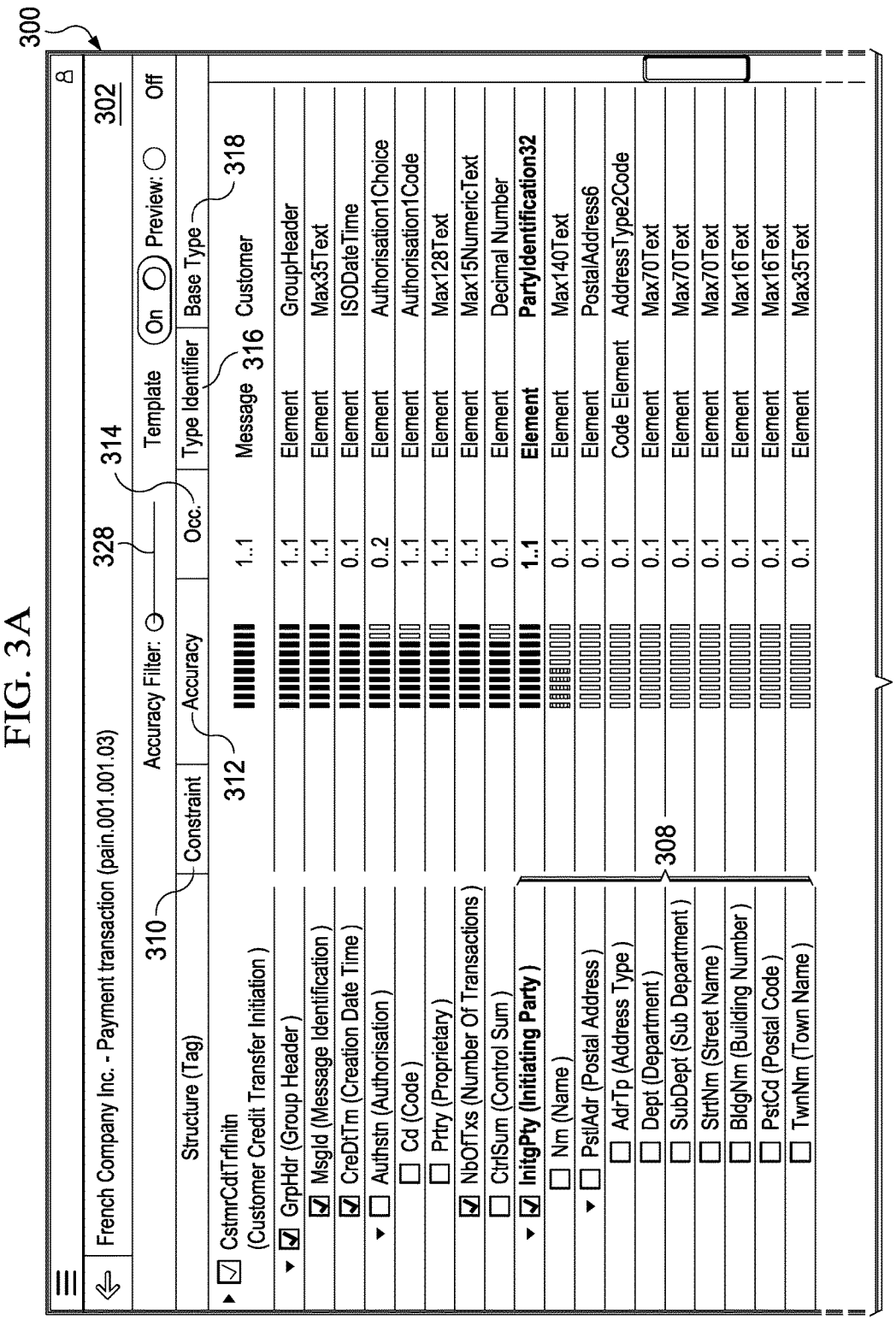
FIGS. 3A-3D depict sections of an example message implementation guideline.
Figure 3B:
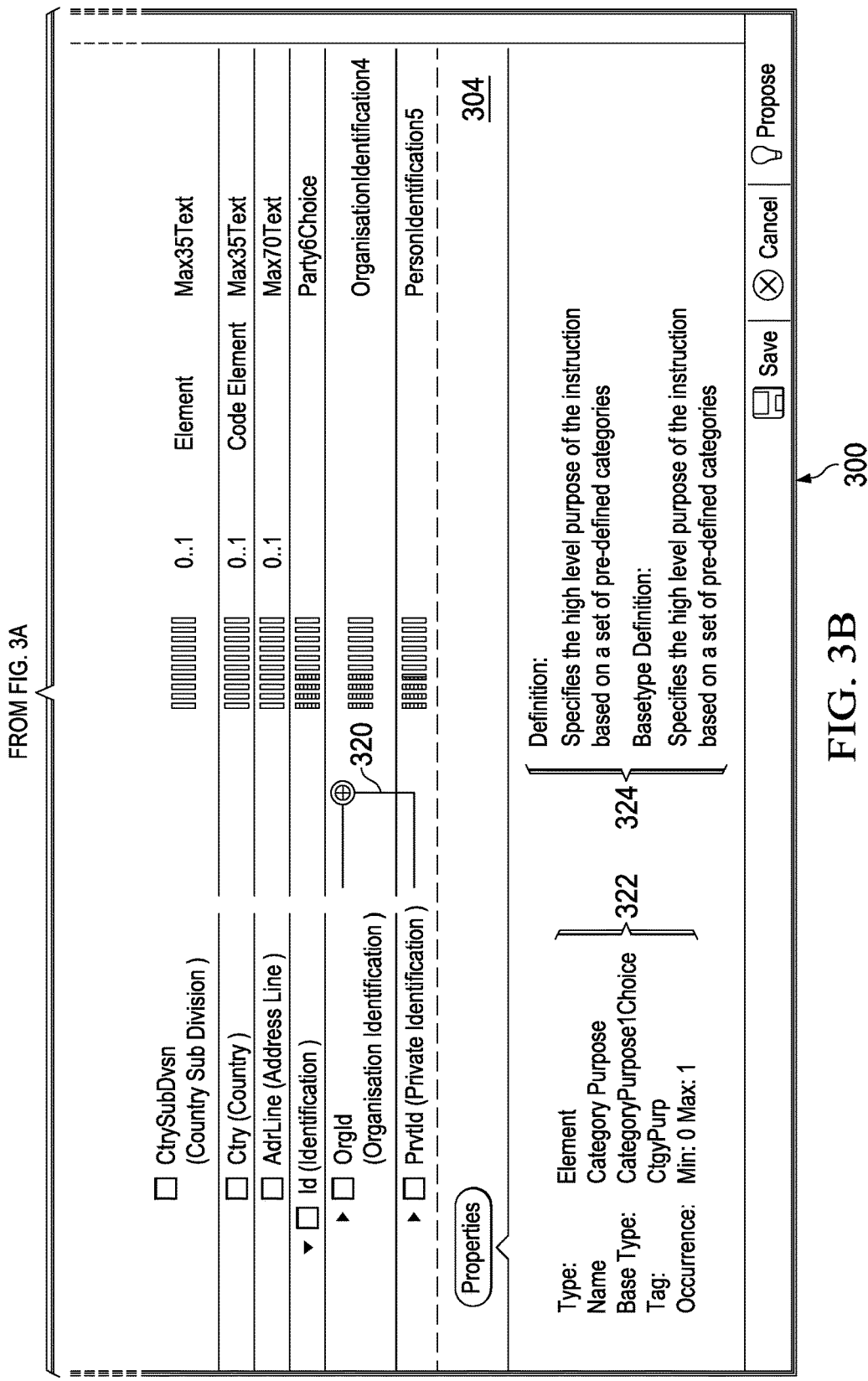
Figures 3C, 3D:
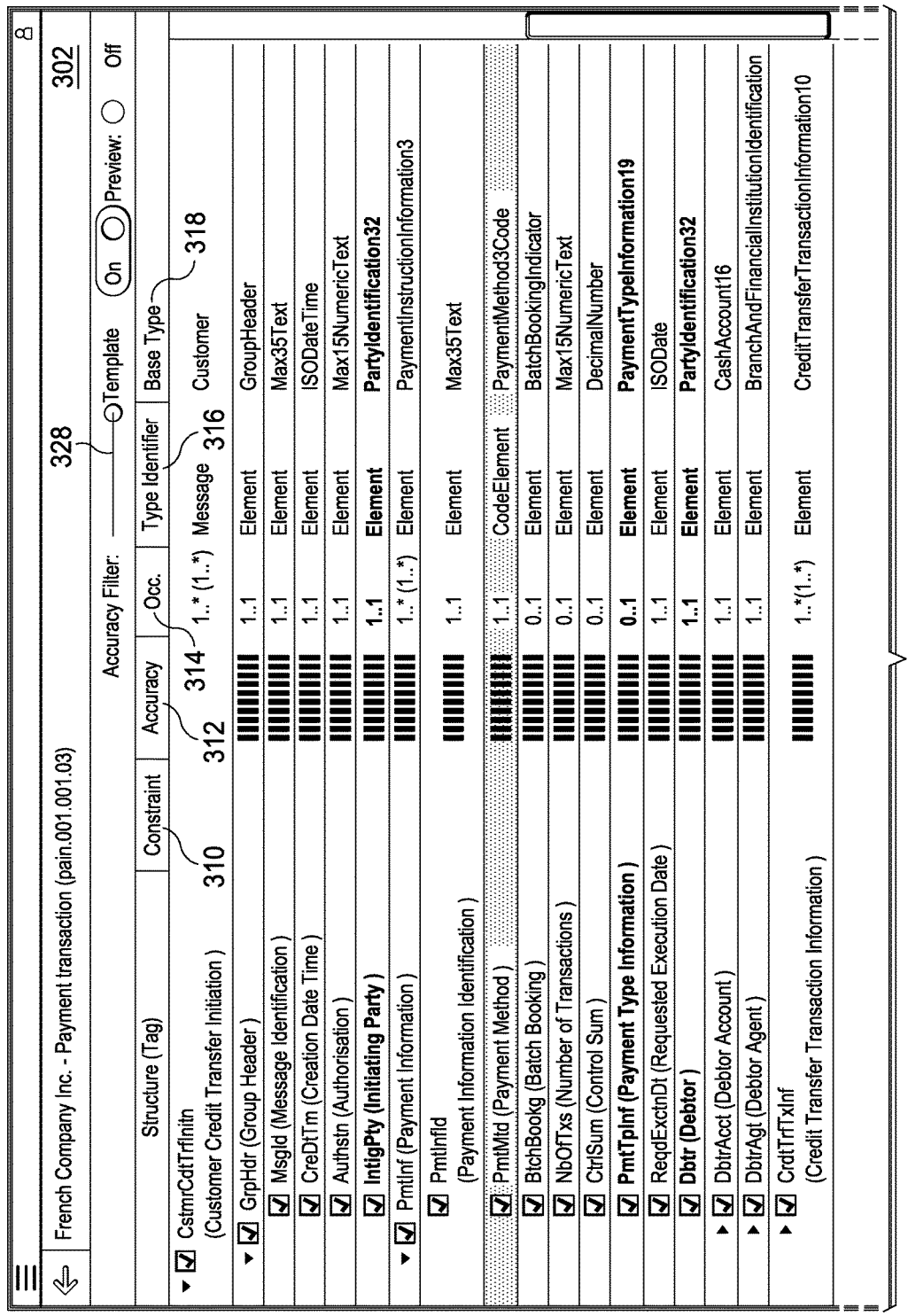
Figure 3D:

In the illustrated examples of FIGS. 3A-3D, the message implementation guideline 300 provides a GUI including one or more site icons that can be selected (e.g., clicked on) by the user. In some examples, the message implementation guideline 300 is displayed by an integration advisor when a user interacting with a GUI selects a message template. The message implementation guideline 300 is based on a template structure 302, properties 304 (as illustrated in FIGS. 3A-3B) and a code list 306 (as illustrated in FIGS. 3C-3D).

The structure 302 can include meta-information required for mapping that is dependent on the context in which the message implementation guideline 300 can be used. For example, the structure 302 can include a plurality of elements 308. The elements 308 can be distributed in a hierarchical tree with multiple (e.g., 10) nested levels. The structure 302 can be substantially smaller than the message types of B2B standards such as a SAP IDoc, ANSI, ASC X12 Transaction Set, or UN/EDIFACT Message. For each element 308, the structure 302 can include constraints 310, an accuracy indicator 312, occurrence frequency 314, a type identifier 316, a base type 318, a value representation 320 and qualifier references. The properties 304 can include detailed information 322 and detailed definitions 324 that can be written in different languages. The detailed information 322 can include length, value spaces, formats and further restrictions. The detailed definitions 324 can include notes, comments, usage rules, code lists and identifier schemes that can be written in different languages. The code list 306 can include a plurality of code values. Names and definitions of code values can be written in different languages.

The message implementation guideline 300 can include multiple filters, such as an accuracy slider 328 and a code selection check box 330. FIGS. 3A-3D show multiple section filter features, which can be used in a message implementation guideline view. The filter selection possibilities can enable a user to fine tune the automatically generated list of elements to align them to business specific requirements. The user can combine different filter criteria such as selecting a particular accuracy level using the accuracy slider 328 or selecting all "code" elements that are necessary in a specific industry. The accuracy slider 328 can be associated to the business context. For example, the accuracy slider 328 filters the most used elements in the given business context.

The multiple selection can enable the user to review the structure 302 and to identify the required elements 308. For example, by selecting maximum accuracy with the accuracy slider 328, a smaller number of elements is displayed (as shown in FIGS. 3C-3D). As a next step, the user can review the suggested content of the structure 302 and can adjust the properties, definitions and code lists. The user can easily and quickly add new elements or delete unnecessary elements by interacting with the message implementation guideline 300. For example, the user can identify and adjust the deltas of the message implementation guideline 300. The final filtering selections of a user can be automatically saved by the system, such that the quality of the automatically generated recommendations can be improved over time. The filtering selections be anonymized and merged with other user selections so that the origin of the "proposed" structure 302 cannot be traced.

FIGS. 4A-4E illustrate sections of example screen-shots of a mapping screen 400. Generally, the mapping screen 400 can include data unambiguously associated to the business semantic level. For example, the mapping screen 400 can include used source message implementation guideline and target message implementation guideline, definition, scope, business context and usage of mapping, mapped nodes on source and target, which are semantically matched together, mapped business rules and/or constraints on source and target, which are semantically matched together, description of mapping behavior, definition of format conversion, mapping between code lists, values and their business meaning, mapping between identifier schemes and their business meaning, examples and remarks.

The example mapping screen 400 of FIGS. 4A-4E is business-specific and business integration process-specific. For example, the mapping screen 400 can be displayed in response to sharing the finalized message implementation guideline (e.g., message implementation guideline 300 of FIGS. 3A-3D) and establish a B2B connection with a business partner(s). Alternatively, the mapping screen 400 can be displayed in response to receiving a new message implementation guideline from a business partner. The mapping screen includes a message implementation guideline of a business entity 402 and a message implementation guideline of a business partner 404. The message implementation guideline of the business entity 402 includes a plurality of source elements 406. The message implementation guideline of the business partner 404 includes a plurality of target elements 408.

Figure 4A:
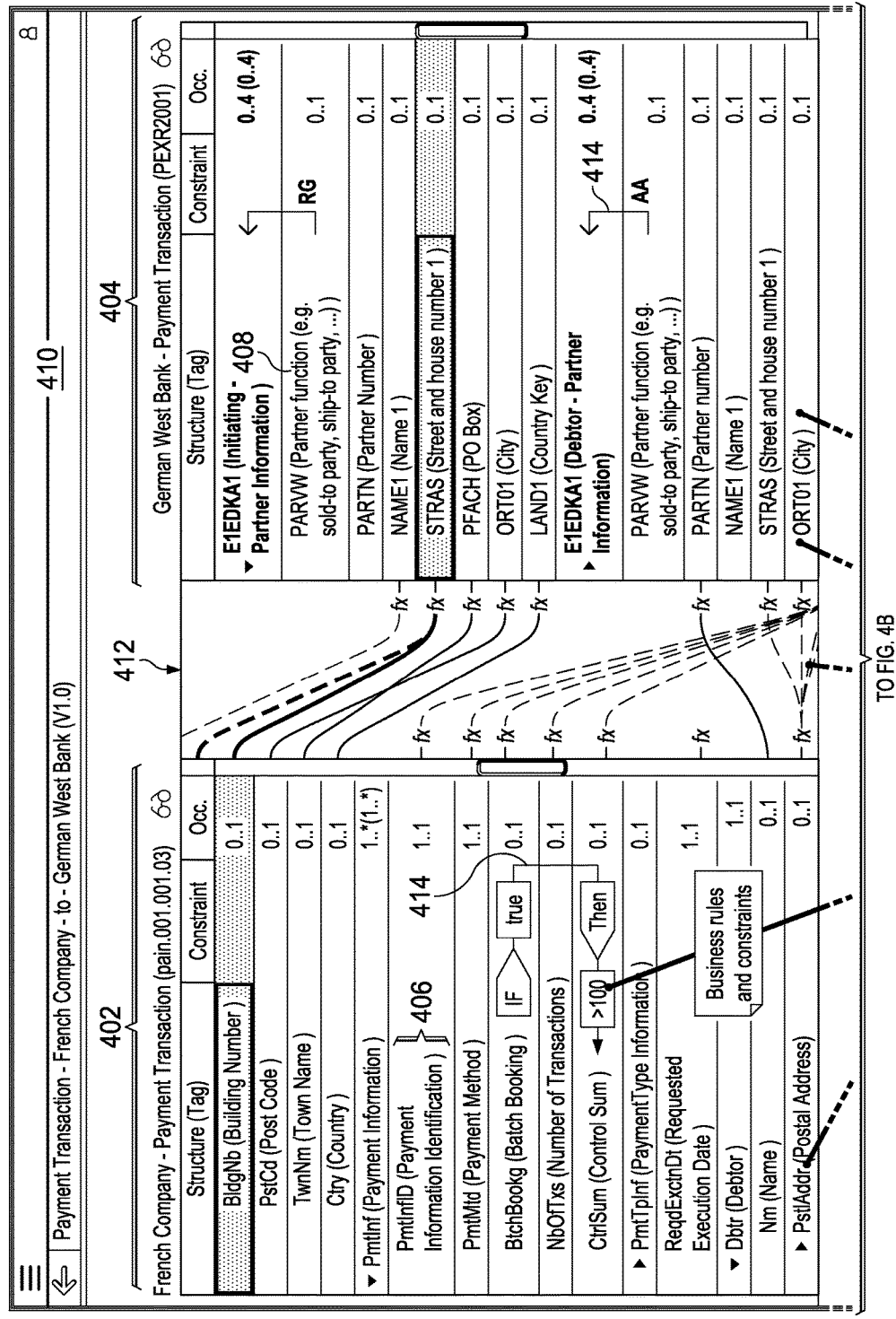
FIGS. 4A-4B depict sections of an example mapping guideline in accordance with implementations of the present disclosure.
Figure 4B:
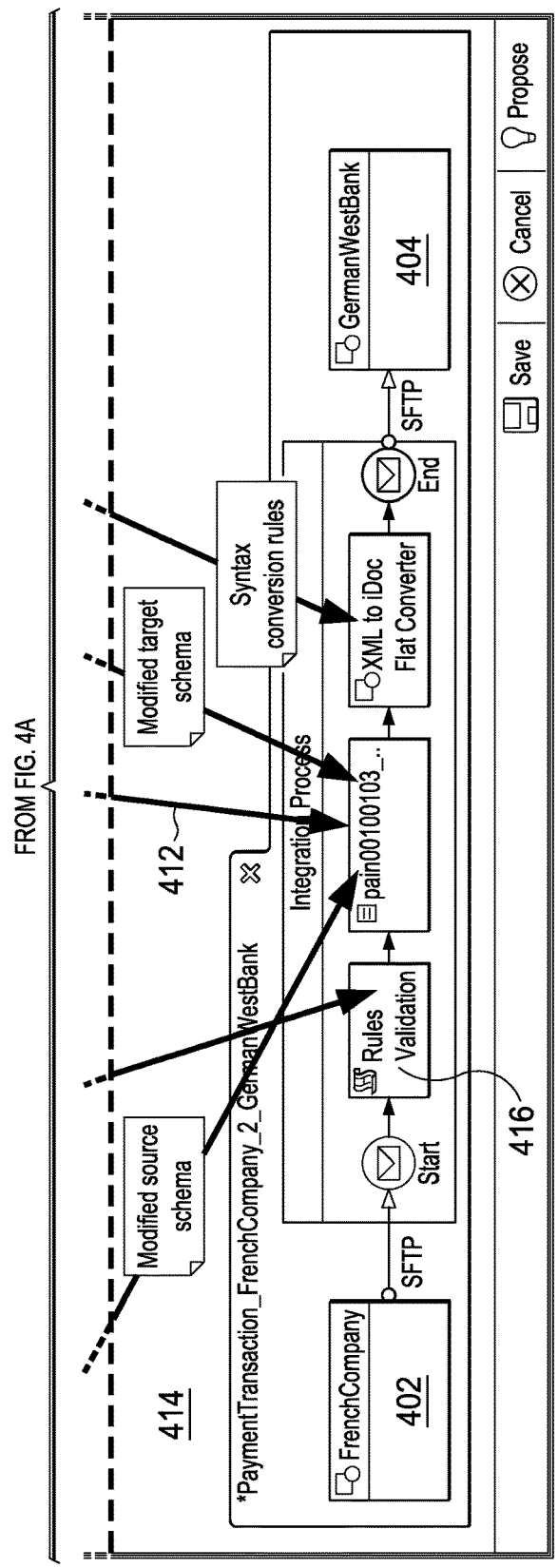
Figure 4C:
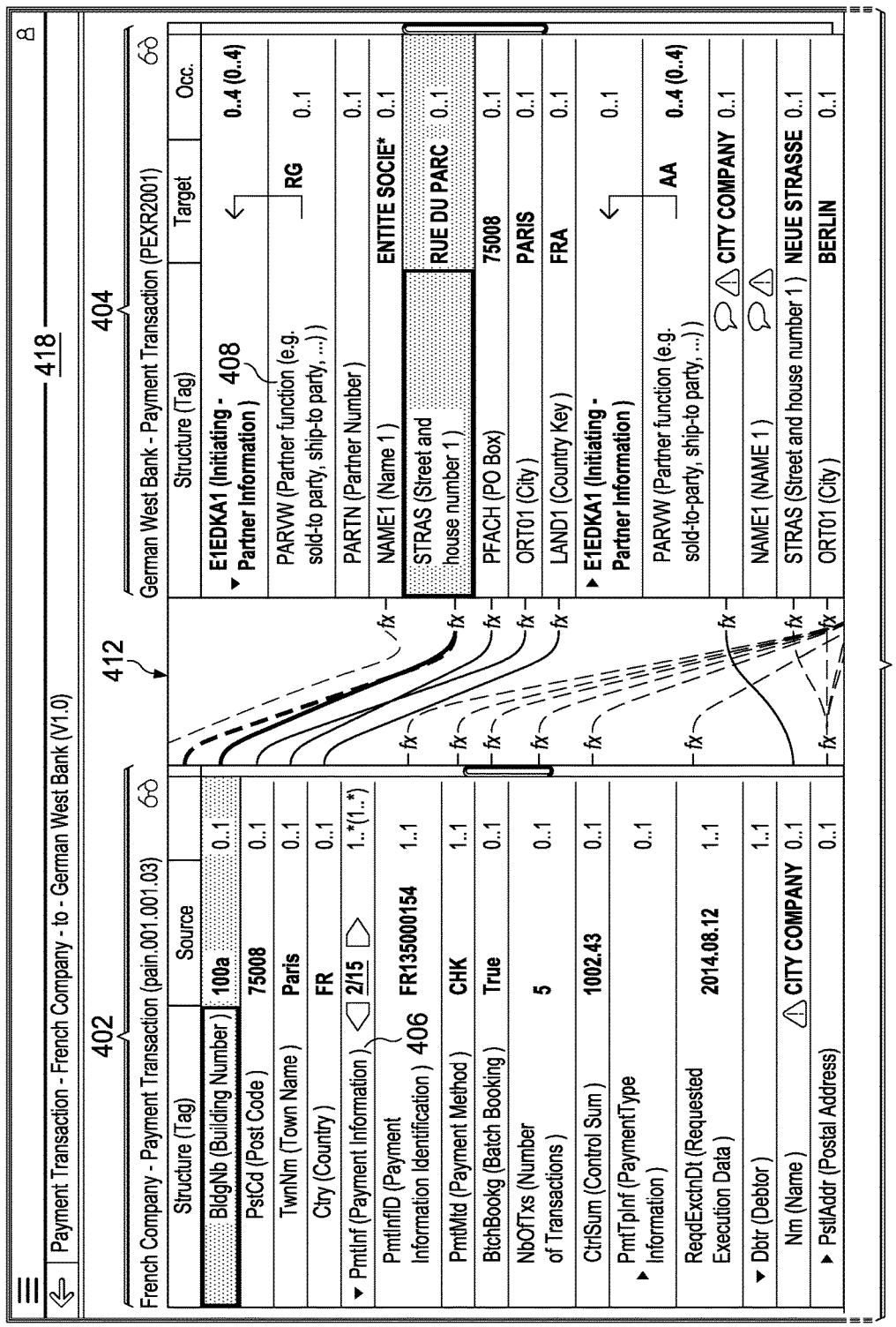

As illustrated in FIGS. 4A-4B, a proposal of a mapping guideline 410 can be displayed. In some examples, the proposal of the mapping guideline 410 can be prefilled with proposals of mapping entities 412 that can provide an optimal match to the priory identified business requirements. The proposal of the mapping guideline 410 can include a single mapping entity 412 between one or more source elements 406 and one or more target elements 408. A user can easily select or deselect the proposed mapping entities 412, or can create new mapping entities 412 in the mapping view 400. For example, a user can create a new mapping entity 412 by dragging and dropping a source element 406 to the required target element 408.

The proposal of the message implementation guideline of a business entity 402 can also include multiple rules 414. The rules 414 can define operations between one or more source elements 406 and one or more target elements 408. For example, a rule 414 can include a concatenation of several source elements and define the mapping to a target element. In some examples, the user can select a rule 414 that can be displayed at the bottom of the mapping guideline, for reviewing and editing it. In some implementations, the rule 414 can be graphically defined. The proposal of the message implementation guideline of a business entity 402 can include a rule validation component 416. The rule validation component 416 can validate the business rules prior to parsing the incoming instance and can generate an exception if the instance data violates a rule.

The mapping view 400 can enables the business entity and the business partner to collaboratively work on the mapping guideline 410 in real time. The mapping guideline 410 can include communication functions, such as commenting, tagging, social networking, and instant messaging. The communication functions can be used to review and comment on each mapping entity 412 of each source element 406 and target element 408. The mapping guideline 410 can be tested by using the mapping testing 418 represented in FIGS. 4C-4E.

The mapping view 400 can include multiple filters, such as an accuracy slider and a mapping selection check box. The filters of the mapping guidelines can be divided into mapping filter categories that include particular features, such as mapping types (e.g., no mapping or hidden mapping), mapping entity functions (e.g., no entity functions, complex functions, concat functions, value mapping and format mapping), leaf nodes (e.g.,) and group nodes (e.g.,). The mapping guideline filters can also be associated to the business context, such as the most used elements in the given business context. The user can combine different filter criteria such as selecting a particular feature from one category and one or more other features from other categories. The filter selection possibilities can enable a user to fine tune the automatically generated list of mappings to align them to business specific requirements.

In the depicted example, the mapping testing 418 provides mapping result 420 together with the message implementation guideline of a business entity 402 (source structure) and the message implementation guideline of a business partner 404 (target structure). The mapping testing 418 can list the mapping, validation and conversion errors. The mapping testing 418 can highlight the mapping, rules, and/or conversion errors. Additionally, the business entity and the business partner can add new mapping guidelines by clicking on the "download" button 422. The users can review the results and can collaboratively comment by clicking on the "comment" button 424 and adding a comment to any location of the mapping testing 418. Corrections can be directly implemented by clicking on the "edit" button 426 and changing the element, mapping entity or business rule associated with the identified error.

Figure 5:
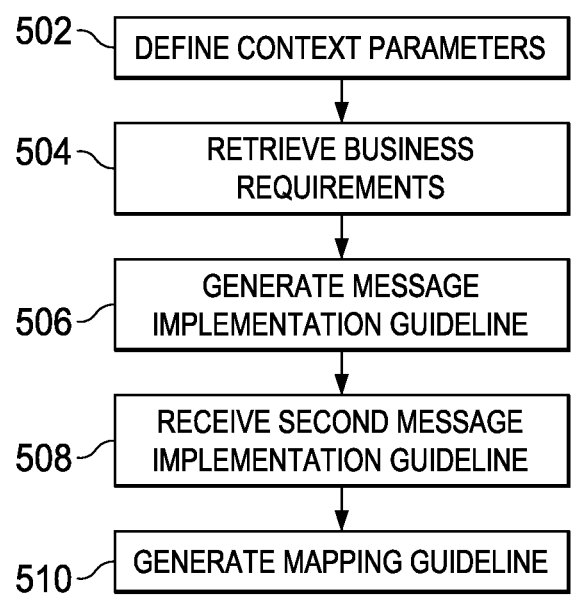
FIG. 5 depicts an example process that can be executed in accordance with implementations of the present disclosure.

FIG. 5 depicts an example process 500 that can be executed in accordance with implementations of the present disclosure. In some examples, the example process 500 can be provided as one or more computer-executable programs executed using one or more computing devices. At step 502, a plurality of business context parameters associated with a first entity and a second entity are defined. At step 504, a first set of business requirements is retrieved from a first entity and a second set of business requirements is retrieved from a second entity based on the business context parameters. In some implementations, a result list including a message implementation guideline templates is displayed. Each of the plurality of message implementation guideline templates can include a system type, an identification, a version and a frequency of usage.

At step 506, a message implementation guideline including one or more source elements associated with the first set of business requirements is generated. The message implementation guideline can be generated by negotiating a modification of a message implementation guideline template based on matching elements. In some implementations, generating a message implementation guideline includes a comparison of the business requirements to standard requirements. The message implementation guideline can be a table including a plurality of columns, each of the columns including a plurality of notes and implementation instructions. The message implementation guideline can include unstructured text blocks. The message implementation guideline can include tag names, cardinality and base types. The message implementation guideline can include a plurality of filter criteria.

At step 508, a second message implementation guideline including one or more target elements is received from the second entity. In some implementations, the syntax of the one or more source elements and the one or more target elements can be converted. At step 510 a mapping guideline including mapping entities between the one or more source elements and the one or more target elements is generated. The mapping entities can depend on semantics and a structure of one of the one or more source elements and one of the one or more target elements. In some implementations, the mapping guideline is generated after validating the mapping between the source elements and the target elements by using a rules validation component.

A mapping message can be generated based on the mapping guideline. The mapping message can be transmitted to the second entity for testing. The mapping interface can be tested based on business expertise and integration expertise. The mapping guideline can be updated based on testing.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing communication between businesses, the method comprising:
   defining a plurality of business context parameters associated with a first entity and a second entity;
   retrieving a first set of business requirements from a first entity and a second set of business requirements from a second entity based on the business context parameters;
   identifying a proposed message implementation guideline based on i) a communication standard between the first and second entities, and ii) one or more stored templates, the one more stored templates associated with a business context matching the plurality of business context parameters associated with the first entity and the second entity;
   generating, in response to receiving an approval signal of the proposed message implementation guide, a finalized, first message implementation guideline comprising source elements associated with the first set of business requirements;
   receiving an indication of an accuracy of the source elements with respect to the first set of business requirements, the accuracy providing an utilization rate of the source elements for the business context associated with the first entity;
   identifying, based on the indicated accuracy, a subset of the source elements;
   receiving a second message implementation guideline comprising target elements from the second entity;
   generating a mapping guideline comprising mapping entities between the subset of the source elements and the target elements, the mapping entities including rules that define mapping between each pair of entities of the first message implementation guideline and the second message implementation guideline, the rules including at least one syntax conversion rule that defines a syntax conversion;
   providing, to a testing component, a mapping message that is derived from the mapping guideline, the mapping message including format transformations of source data values and target data values, wherein the testing component processes the source data values and the target data values, based on the format transformations, to be displayable in a readable format, wherein the format transformations and syntax conversion maintain a semantic matching between the source data values and the target data values, and wherein the semantic mapping is associated with the mapping guideline;
   displaying, by the testing component, an overview of the mapping message, the overview including the source data values in the readable format, the target data values in the readable format, and the syntax conversion between the source data values and the target data values;
   validating the rules to identify a violation of the rules by the source elements and the target elements, wherein the rules are validated prior to generating the mapping guidelines; and
   in response to identifying the violation, generating an exception of the violation within the rules.

2. The computer-implemented method of claim 1, wherein generating the finalized, first message implementation guideline comprises a comparison of the business requirements to standard requirements.

3. The computer-implemented method of claim 1, wherein the mapping entities are dependent on semantics and a structure of one of the source elements and one of the target elements.

4. The computer-implemented method of claim 1, wherein the finalized, first message implementation guideline is a table comprising a plurality of columns, each of the columns comprising a plurality of notes and implementation instructions.

5. The computer-implemented method of claim 1, wherein the finalized, first message implementation guideline comprises unstructured text blocks.

6. The computer-implemented method of claim 1, wherein the finalized, first message implementation guideline comprises tag names, cardinality and base types.

7. The computer-implemented method of claim 1, further comprising displaying a result list comprising a plurality of message implementation guideline templates.

8. The computer-implemented method of claim 7, wherein each of the plurality of message implementation guideline templates comprises a system type, an identification, a version and a frequency of usage.

9. The computer-implemented method of claim 7, wherein generating the finalized, first message implementation guideline further comprises modifying one of the plurality of message implementation guideline templates based on matching elements.

10. The computer-implemented method of claim 1, further comprising testing of the mapping interface based on business expertise and integration expertise.

11. The computer-implemented method of claim 1, wherein the finalized, first message implementation guideline comprises a plurality of filter criteria.

12. The computer-implemented method of claim 1, further comprising transmitting the finalized, first message implementation guideline to the second entity.

13. The computer-implemented method of claim 1, further comprising performing the syntax conversion for the source elements and the target elements.

14. The computer-implemented method of claim 1, wherein generating the mapping guideline further comprises validation of the mapping by using a rules validation component.

15. The computer-implemented method of claim 1, further comprising generating the mapping message based on the mapping guideline.

16. The computer-implemented method of claim 1, further comprising transmitting the mapping message to the second entity for testing by the testing component executing on the second entity.

17. The computer-implemented method of claim 16, further comprising updating the mapping guideline based on testing.

18. The computer-implemented method of claim 1, wherein the context parameters include geopolitical parameters, business process role parameters, and industry classification parameters.

19. A non-transitory computer-readable storage medium coupled to one or more processors and having instructions stored thereon which, when executed by the one or more processors, cause the one or more processors to perform operations for managing communication between businesses, the operations comprising:
    defining a plurality of business context parameters associated with a first entity and a second entity;
    retrieving a first set of business requirements from a first entity and a second set of business requirements from a second entity based on the business context parameters;
    identifying a proposed message implementation guideline based on i) a communication standard between the first and second entities, and ii) one or more stored templates, the one more stored templates associated with a business context matching the plurality of business context parameters associated with the first entity and the second entity;
    generating, in response to receiving an approval signal of the proposed message implementation guide, a finalized, first message implementation guideline comprising source elements associated with the first set of business requirements;
    receiving an indication of an accuracy of the source elements with respect to the first set of business requirements, the accuracy providing an utilization rate of the source elements for the business context associated with the first entity;
    identifying, based on the indicated accuracy, a subset of the source elements;
    receiving a second message implementation guideline comprising target elements from the second entity;
    generating a mapping guideline comprising mapping entities between the subset of the source elements and the target elements, the mapping entities including rules that define mapping between each pair of entities of the first message implementation guideline and the second message implementation guideline, the rules including at least one syntax conversion rule that defines a syntax conversion;
    providing, to a testing component, a mapping message that is derived from the mapping guideline, the mapping message including format transformations of source data values and target data values, wherein the testing component processes the source data values and the target data values, based on the format transformations, to be displayable in a readable format, wherein the format transformations and syntax conversion maintain a semantic matching between the source data values and the target data values, and wherein the semantic mapping is associated with the mapping guideline;
    displaying, by the testing component, an overview of the mapping message, the overview including the source data values in the readable format, the target data values in the readable format, and the syntax conversion between the source data values and the target data values;
    validating the rules to identify a violation of the rules by the source elements and the target elements, wherein the rules are validated prior to generating the mapping guidelines; and
    in response to identifying the violation, generating an exception of the violation within the rules.

20. A system, comprising:
    a computing device; and
    a non-transitory computer-readable storage device coupled to the computing device and having instructions stored thereon which, when executed by the computing device, cause the computing device to perform operations for managing communication between businesses, the operations comprising:
        defining a plurality of business context parameters associated with a first entity and a second entity;
        retrieving a first set of business requirements from a first entity and a second set of business requirements from a second entity based on the business context parameters;
        identifying a proposed message implementation guideline based on i) a communication standard between the first and second entities, and ii) one or more stored templates, the one more stored templates associated with a business context matching the plurality of business context parameters associated with the first entity and the second entity;
        generating, in response to receiving an approval signal of the proposed message implementation guide, a finalized, first message implementation guideline comprising source elements associated with the first set of business requirements;
    receiving an indication of an accuracy of the source elements with respect to the first set of business requirements, the accuracy providing an utilization rate of the source elements for the business context associated with the first entity;
    identifying, based on the indicated accuracy, a subset of the source elements;

receiving a second message implementation guideline comprising target elements from the second entity;

generating a mapping guideline comprising mapping entities between the subset of the source elements and the target elements, the mapping entities including rules that define mapping between each pair of entities of the first message implementation guideline and the second message implementation guideline, the rules including at least one syntax conversion rule that defines a syntax conversion;

providing, to a testing component, a mapping message that is derived from the mapping guideline, the mapping message including format transformations of source data values and target data values, wherein the testing component processes the source data values and the target data values, based on the format transformations, to be displayable in a readable format, wherein the format transformations and syntax conversion maintain a semantic matching between the source data values and the target data values, and wherein the semantic mapping is associated with the mapping guideline;

displaying, by the testing component, an overview of the mapping message, the overview including the source data values in the readable format, the target data values in the readable format, and the syntax conversion between the source data values and the target data values;

validating the rules to identify a violation of the rules by the source elements and the target elements, wherein the rules are validated prior to generating the mapping guidelines; and in response to identifying the violation, generating an exception of the violation within the rules.

* * * * *